(12) United States Patent
    Goulanian

(10) Patent No.: US 9,182,605 B2
(45) Date of Patent: Nov. 10, 2015

(54) FRONT-PROJECTION AUTOSTEREOSCOPIC 3D DISPLAY SYSTEM

(71) Applicant: Emine Goulanian, Richmond (CA)

(72) Inventor: Emine Goulanian, Richmond (CA)

( * ) Notice: Subject to any disclaimer, the term of this patent is extended or adjusted under 35 U.S.C. 154(b) by 120 days.

(21) Appl. No.: 14/167,512

(22) Filed: Jan. 29, 2014

(65) Prior Publication Data

US 2015/0212333 A1    Jul. 30, 2015

(51) Int. Cl.
    *G03B 35/18*    (2006.01)
    *G02B 27/22*    (2006.01)
    *H04N 13/04*    (2006.01)

(52) U.S. Cl.
    CPC .......... *G02B 27/2214* (2013.01); *G02B 27/225* (2013.01); *G03B 35/18* (2013.01); *H04N 13/0402* (2013.01); *H04N 13/0447* (2013.01)

(58) Field of Classification Search
    USPC ........... 353/7; 352/61; 349/15; 359/466, 471, 359/462, 463, 458; 348/59
    See application file for complete search history.

(56) References Cited

U.S. PATENT DOCUMENTS

| | | | |
|---|---|---|---|
| 2,198,678 | A | 4/1940 | Victor |
| 3,632,866 | A | 1/1972 | King |
| 3,932,699 | A | 1/1976 | Tripp |
| 4,160,973 | A | 7/1979 | Berlin |
| 5,132,839 | A | 7/1992 | Travis |
| 5,550,765 | A | 8/1996 | Bhattacharya et al. |
| 5,581,378 | A | 12/1996 | Kowel et al. |
| 5,703,717 | A | 12/1997 | Ezra et al. |
| 5,712,732 | A | 1/1998 | Street |
| 5,742,332 | A | 4/1998 | Imai et al. |
| 5,745,197 | A | 4/1998 | Eng et al. |
| 5,930,037 | A | 7/1999 | Imai |
| 6,061,083 | A | 5/2000 | Aritake et al. |
| 6,061,179 | A | 5/2000 | Inoguchi et al. |
| 6,069,650 | A | 5/2000 | Battersby |
| 6,268,881 | B1 | 7/2001 | Muramoto |
| 6,337,721 | B1 | 1/2002 | Hamagishi et al. |

(Continued)

FOREIGN PATENT DOCUMENTS

| | | |
|---|---|---|
| CA | 2165432 C | 5/2001 |
| DE | 19910157 A1 | 9/1999 |

(Continued)

OTHER PUBLICATIONS

Whearston, "Contributions to the Physiology of Vision," 1838, pp. 371-394, 128, Royal Society of London, London.

(Continued)

*Primary Examiner* — William C Dowling
(74) *Attorney, Agent, or Firm* — Thomas E. Loop

(57) ABSTRACT

A front-projection 3D autostereoscopic display system using time-sequencing approach is configured for forming a plurality of perspective views of 3D images of an object or scene in a field of view. The 3D displays system comprises a display component, an optical scanning assembly, a sensor and a controller. The optical scanning assembly includes a first lens array, an optical beam shifting device, an optical projection block and a reflection screen. The reflection screen comprises a second converging lens array and a mirror. In the first and second embodiments of the present invention the reflection screen is made respectively flat or curved. The present invention can be used with a wide range of screen sizes especially for large screens and allows significant reduction or elimination of optical cross-talk and also reduces mechanical complexity of 3D display system.

25 Claims, 9 Drawing Sheets

(56) References Cited

U.S. PATENT DOCUMENTS

| | | |
|---|---|---|
| 6,476,850 B1 | 11/2002 | Erbey |
| 6,487,020 B1 | 11/2002 | Favalora |
| 6,533,420 B1 | 3/2003 | Eichenlaub |
| 6,552,348 B2 | 4/2003 | Cherry et al. |
| 6,574,042 B2 | 6/2003 | Allio |
| 6,744,053 B2 | 6/2004 | Wong et al. |
| 6,831,678 B1 | 12/2004 | Travis |
| 6,834,961 B1 * | 12/2004 | Cobb et al. ............... 353/7 |
| 6,909,097 B2 | 6/2005 | Schreiner et al. |
| 6,946,658 B2 | 9/2005 | Tai |
| 7,038,212 B2 | 5/2006 | Wollenweber et al. |
| 7,049,600 B2 | 5/2006 | Levin |
| 7,050,020 B2 | 5/2006 | Uehara et al. |
| 7,064,895 B2 | 6/2006 | Morishima et al. |
| 7,944,465 B2 | 5/2011 | Goulanian et al. |
| 8,075,138 B2 * | 12/2011 | Thomas ................. 353/7 |
| 8,243,127 B2 * | 8/2012 | Goulanian et al. .......... 348/54 |
| 8,264,772 B2 * | 9/2012 | Javidi et al. ............ 359/462 |
| 2002/0190214 A1 | 12/2002 | Morales Serrano et al. |
| 2003/0076281 A1 | 4/2003 | Lys et al. |
| 2004/0189970 A1 | 9/2004 | Takada |
| 2005/0270645 A1 | 12/2005 | Cossairt et al. |
| 2005/0285997 A1 | 12/2005 | Koyama et al. |
| 2006/0087449 A1 | 4/2006 | Radzinski |
| 2006/0092158 A1 | 5/2006 | Shestak |
| 2006/0114415 A1 | 6/2006 | Shestak et al. |
| 2006/0176557 A1 | 8/2006 | Travis et al. |
| 2006/0202910 A1 | 9/2006 | Cha et al. |
| 2006/0244958 A1 | 11/2006 | Furman et al. |
| 2007/0008617 A1 | 1/2007 | Shestak et al. |
| 2007/0008619 A1 | 1/2007 | Cha et al. |
| 2007/0008620 A1 | 1/2007 | Shestak et al. |
| 2007/0019856 A1 | 1/2007 | Furman et al. |
| 2011/0157330 A1 * | 6/2011 | Bennett et al. ............ 348/54 |
| 2011/0216171 A1 | 9/2011 | Barre et al. |
| 2014/0028807 A1 * | 1/2014 | Goulanian et al. .......... 348/51 |
| 2014/0300869 A1 * | 10/2014 | Hirsch et al. ............ 353/7 |

FOREIGN PATENT DOCUMENTS

| | | |
|---|---|---|
| EP | 1221817 A1 | 10/2002 |
| EP | 1394593 A1 | 2/2010 |
| WO | 2005008314 A1 | 1/2005 |
| WO | 2007003792 A1 | 11/2007 |

OTHER PUBLICATIONS

Lizuka, "Using Cellophane to Convert a Liquid Crystal Display Screen into a Three-dimensional Display (3D Laptop Computer and 3D Camera Phone)," 2006, Canada.

Whearston, "On Some Remarkable, and hitherto Unobserved, Phenomena of Binocular Vision," Philosophical Transactions of the Royal Society London, 1838, London, England.

Benton, "Autostereoscope Becomes Holography: Historical Connections," Selected Papers on Three-Dimensional Displays, SPIE Milestone Series, 2000, pp. 154-167, vol. MS 162, Boston, MA, US.

* cited by examiner

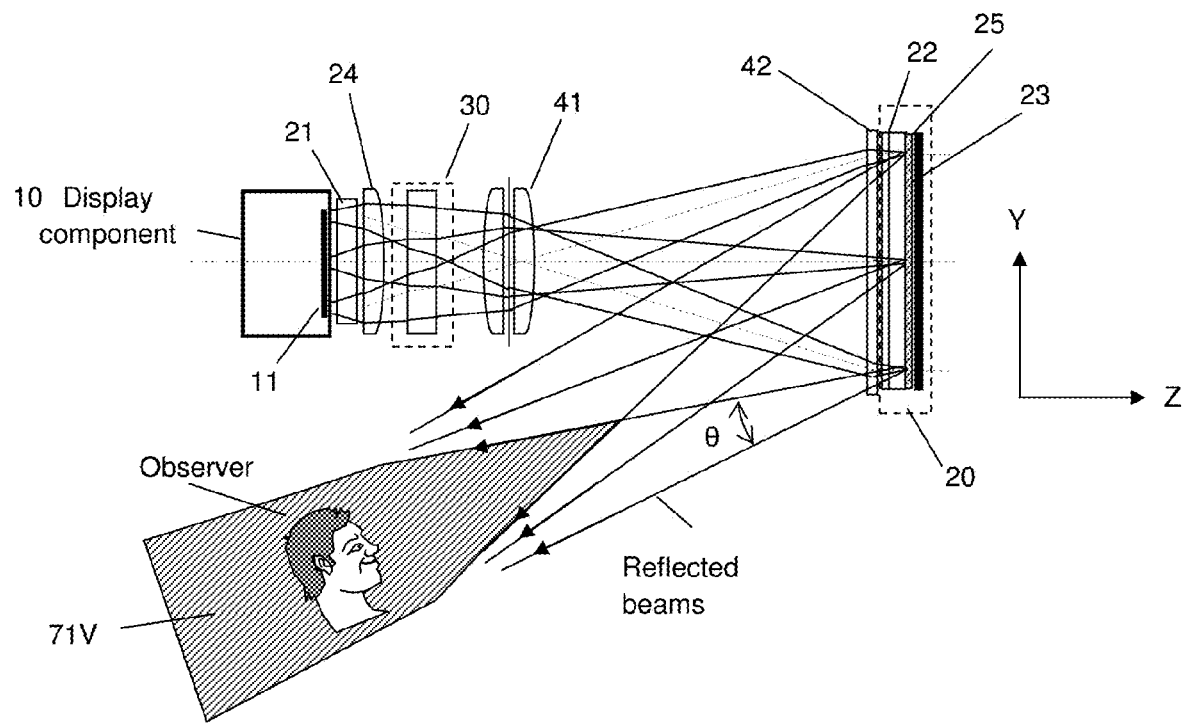
FIG. 4b.
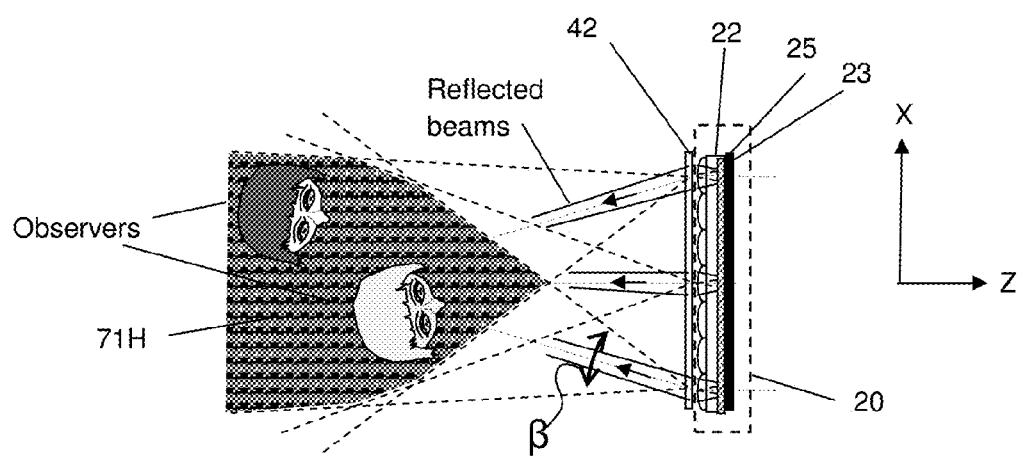
FIGg. 4c.

FRONT-PROJECTION AUTOSTEREOSCOPIC 3D DISPLAY SYSTEM

TECHNICAL FIELD

The present invention relates to three-dimensional (3D) auto-stereoscopic displays using time-sequencing approach and, in particular, to 3D autostereoscopic projection display systems using at least two lens arrays and providing multiple perspective views to form 3D image in the field of view.

BACKGROUND OF THE INVENTION

There are two main classes of 3D auto-stereoscopic displays that based on using different approaches: "space multiplexing (sharing)" or and "time sequencing (sharing)".

The main disadvantage of 3D auto-stereoscopic displays using space sharing approach is that the resolution of the 3D image is reduced with increasing the number of perspective views forming the 3D image in the field of view. That results in 3D image quality degradation and restriction of its viewing angle.

Unlike space-sharing displays, 3D auto-stereoscopic time-sequencing display systems reproduce 3D image with resolution that doesn't depend on the number of perspective views. That allows widening the 3D image viewing angle by increasing the number of perspective views without reducing resolution of the 3D image.

There are several 3D projection display systems known in the prior art that embody the time-sequencing approach and use at least two lens matrices (arrays), for example, the ones described in U.S. Pat. No. 7,944,465 B2, and U.S. Pat. No. 8,243,127 B2 and US Patent Application US 2005/0270645.

US Patent Application US 2005/0270645 describes a 3D display apparatus comprising a display component for generating a sequence of 2-dimensional (2D) images and an image scanning assembly consisting of a first lens matrix (array), a second lens matrix (array) optically coupled to the first lens matrix (array) via intermediary optical assembly.

The peculiarity of this scanning assembly consists in that the first lens array can be made significantly smaller than the second array, if the intermediary optical assembly is a magnification system. This allows shifting the first lens array for scanning images instead of shifting the second array that can be made much larger and thereby significantly reduce the mechanical complexity of the scanning operation and make 3D display systems more compact. This is much more favorable for 3D display systems with the large screen.

However, this advantage is achieved at the expense of increasing optical cross-talk. There are two sources of cross-talk in the image scanning assembly described in US Patent Application US 2005/0270645. One of them (the first source) is associated with shifting the structure of optical beams at the second lens array (shown FIG. 1, Prior Art) relative to the structure of the second lens array during the scanning operation. The second source of cross-talk is associated with the mismatch between the structure of 2D images at the first lens array shifting during the scanning operation and the structure of this array.

It is worth noting that the level of cross-talk from both sources grows with the amplitude of the displacement of the first lens array, resulting in 3D image quality degradation and restriction of its viewing angle.

It should be noted that the second source of cross-talks could be eliminated if the first lens array is displaced together with the display component. But in this case, higher mechanical complexity can effectively cancel the advantage of using a small-size first lens array. Therefore, it is necessary to find another decision to solve this cross-talk problem.

The said crosstalk problems can be partially solved by adopting the solution describing the 3D display systems disclosed in the prior art (U.S. Pat. No. 7,944,465 B2 and U.S. Pat. No. 8,243,127 B2). Each of these systems comprises a display component for generating a sequence of 2-dimensional (2D) images, an image scanning assembly consisting of a first lens matrix (array) and a complex of two (second and third) lens matrices (arrays), and a mechanism for transverse displacement of the first matrix or the complex of matrices relative to each other to provide the scanning operation.

Actually, due to the use of three lens arrays, the level of cross-talk related to the said first source of cross-talk is significantly reduced, thereby allowing better quality of the 3D image and a larger viewing angle. This is provided by the fact that during the scanning operation an optical beam going through each lens of the second lens array is directed by the said lens to the respective lens of the third lens array within the aperture of the latter lens.

Meanwhile, the said second source of cross-talk is inherent both in 3D display systems disclosed in the respective versions of U.S. Pat. No. 7,944,465 B2 and U.S. Pat. No. 8,243,127 B2 associated with the movement of the first matrix and in those of US 2005/0270645. That prevents from further increasing quality of the 3D image and its viewing angle.

Besides, the possibility of using the solution disclosed in U.S. Pat. No. 7,944,465 B2 and U.S. Pat. No. 8,243,127 B2 for implementation of large-screen 3D display systems is restricted because of higher mechanical complexity of the scanning operation.

It should be noted that implementation of large-screen 3D display systems based on both the solution disclosed in U.S. Pat. No. 7,944,465 B2 and U.S. Pat. No. 8,243,127 B2 and the solution disclosed in US 2005/0270645 is not feasible without reducing the level of cross-talk mentioned above.

Therefore, it is necessary to find another solution for implementation of large-screen 3D display systems to solve prior art problems related to cross-talk and mechanical complexity of the scanning operation.

This conclusion is equally applicable both to rear-projection autostereoscopic 3D display systems and to front-projection autostereoscopic 3D display systems. Meanwhile, these 3D display systems have different fields of application. Thus, front-projection autostereoscopic 3D display systems are preferably used when the screen of a very large size (in particular, jumbo screen) is required.

SUMMARY OF THE INVENTION

The general object of the present invention is to propose a front-projection large screen 3D display system having higher 3D image quality and enlarged 3D image viewing angle by significantly reducing or eliminating optical cross-talk associated with the scanning operation and thereby to solve problems of the related prior art.

Another object of the present invention is to reduce mechanical complexity of the scanning assembly and of the front-projection 3D display system as a whole.

Yet another object of the present invention is to widen the application field of front-projection 3D display systems having screens of different shapes and a wide range of screen sizes (including jumbo screen).

The main idea of the present invention consists in that the scanning operation is accomplished without moving lens arrays forming the 3D image. Instead, a special optical device is provided for transversal shifting of optical beams propagating between the lens arrays. And, apart from this, an optical projection block is provided for matching the structure of optical beams going through the said special optical device and the structure of the lens arrays.

This allows a significant reduction or complete elimination of cross-talk associated with the scanning operation.

In particular, the use of stationary lens arrays allows matching of the structure of optical beams emanating from the display surface to the structure of the first lens array and thereby significantly reducing or eliminating the level of cross-talk associated with the said second source of cross-talk.

Whereas, the use of the complex of two (second and third) lens arrays (similar to that disclosed in U.S. Pat. No. 7,944, 465 B2 and U.S. Pat. No. 8,243,127 B2) and focusing optical beams on the second lens array allows significant reduction or elimination of the level of cross-talk associated with the said first source of cross-talk.

The main idea of this invention also enables achievement of another object of the present invention. Thus, the special optical device, the first lens array, and display component can be made significantly smaller than the complex of two (second and third) lens arrays. In this case the mechanical complexity of the scanning assembly and of the 3D display system as a whole will be much lower for implementation of large-screen 3D display systems and, what is most important, without at the same time increasing the level of cross-talk.

The main idea can also be used in front-projection 3D display systems having screens of different shapes and a wide range of screen sizes (including jumbo screen).

The invention is defined by the independent claim. The dependent claims provide advantageous embodiments.

According to the present invention there is provided a front-projection autostereoscopic 3D display system configured for forming a plurality of perspective views of 3D images of an object or scene in a field of view. The 3D display system comprises: a display component for generating a sequence of 2-dimensional (2D) images, an optical scanning assembly for transforming optical beams emanating from each 2D image on the displaying surface and sending the transformed optical beams in the direction of the corresponding perspective view in the field of view, a sensor, and a controller.

The display component includes a display surface for displaying 2D images, a data input for updating 2D images, and a synchronization input.

The optical scanning assembly includes a first lens array, an optical beam shifting device, an optical projection block, and a reflection screen including a second converging lens array and a mirror (reflector). The first lens array, the optical projection block, and the reflection screen remain stationary with respect to each other and to the display component.

Each lens of the first lens array is optically coupled to one respective area of the display surface along a respective optical axis. Each lens of the second lens array is optically coupled to one respective lens of the first lens array through the optical projection block and the optical beam shifting device, whereas the mirror being disposed from the second lens array at a distance of half of the focal length of lenses of the second lens array.

The optical beam shifting device includes an optical component for shifting optical beams going therethrough and a driver having a control input.

The optical projection block is configured to focus each optical beam on one respective lens of the second lens array and to send the optical beam reflected from the mirror further through the same lens of the second lens array in the direction of the respective perspective view.

The sensor is configured for sensing the position of shifted optical beams and has a synchrosignal output.

The controller is configured for controlling scanning parameters and synchronisation of 2D images displayed on the display surface with the position of shifted optical beams. The controller has a synchrosignal input connected to the synchrosignal output of the sensor, a synchronization output connected to the synchronization input of the display component, and a control output connected to the control input of the driver of the optical beam shifting device.

These and other embodiments of the present invention will become more evident upon reference to the following detailed description and attached drawings. It is to be understood, however, that various changes, alterations, and substitutions may be made to the specific embodiments disclosed herein without departing from their essential spirit and scope.

BRIEF DESCRIPTION OF THE DRAWINGS

The drawings are intended to be illustrative and symbolic representations of certain preferred and exemplary embodiments of the present invention and as such, they are not necessarily drawn to scale. Reference numerals and symbols are used to designate specific features that are schematically shown and described.

FIG. 4b is a schematic representation of the 3D display system (side view) of FIG. 4a with the illustration of paths of optical beams reflected from the reflection screen in the vertical plane.

FIG. 4c is a schematic representation of the reflection screen of the 3D display system of FIG. 4a with the illustration of paths of optical beams reflected from the screen in the horizontal plane.

DETAILED DESCRIPTION OF THE PREFERRED EMBODIMENTS

Figure 1:
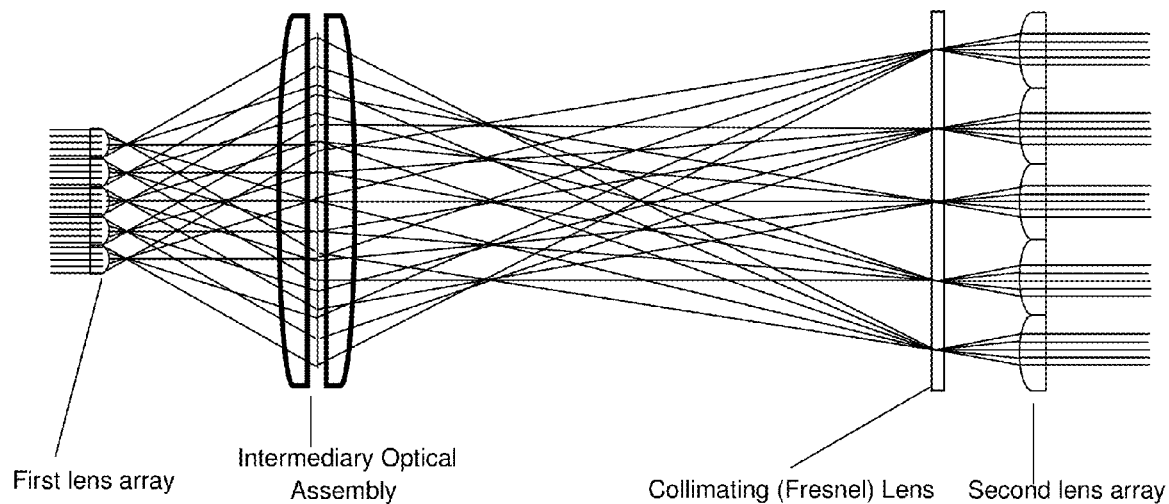
FIG. 1 is a schematic representation (prior art) of an image scanning assembly disclosed in US 2005/0270645.

FIG. 1 illustrates the structure of the image scanning assembly disclosed in US 2005/0270645 (prior art) and the paths of optical beams in this assembly. The peculiarity of this scanning assembly consists in that the first lens array can be made significantly smaller than the second lens array, if the intermediary optical assembly is a magnification assembly. This allows shifting the first lens array for scanning images instead of shifting the second lens array and thereby significantly reducing the mechanical complexity of the scanning operation and providing more compact 3D display systems. This is much more favorable for large-screen 3D display systems.

However, this advantage is achieved at the expense of increased optical cross-talk. There are two sources of crosstalks in the image scanning assembly described in US Patent Application US 2005/0270645. One of them is associated with shifting the structure of optical beams at the second lens array (shown in FIG. 1, Prior Art) with respect to the structure of this array during the scanning operation. The second source of cross-talk is associated with a mismatch between the structure of 2D images at the first lens array and the structure of this array during the scanning operation.

In most applications of 3D display systems it is necessary to have a large number of perspective views and a wide viewing angle. However, it usually requires increasing the amplitude of lens array shift. The level of cross-talk for both sources in this structure grows with the amplitude of shifting and so this structure is not suitable for such applications.

Figure 2:
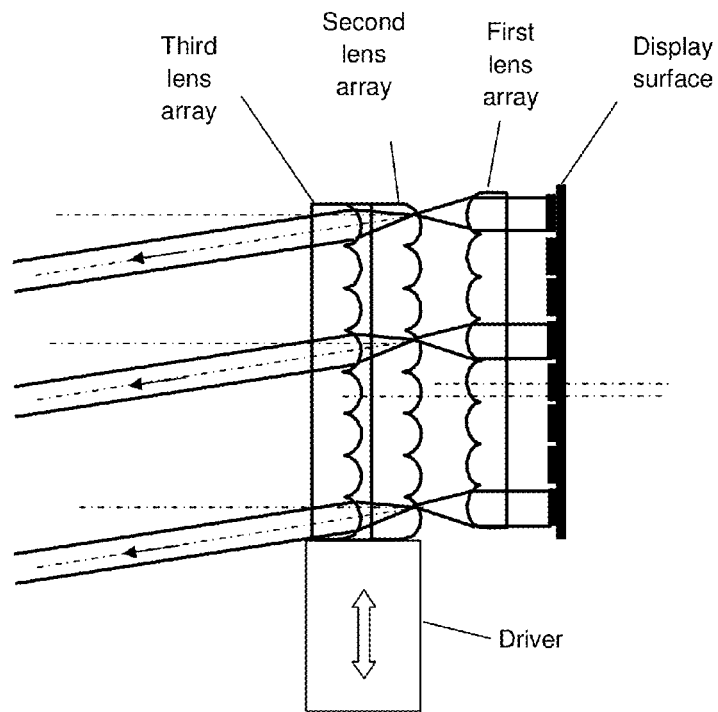
FIG. 2 is a schematic representation (prior art) of an optical imaging system disclosed in U.S. Pat. No. 7,944,465 B2.

The said first source of cross-talk problems can be eliminated by implementing the solution describing the structure of the optical imaging system disclosed in U.S. Pat. No. 7,944,465 B2 (see FIG. 2 Prior art). This can be provided by using the complex of two (second and third) lens arrays.

Meanwhile, the problem associated with the second source of cross-talk is inherent both in 3D display systems disclosed in the respective versions of U.S. Pat. No. 7,944,465 B2 and in those of US 2005/0270645. That prevents from further increasing quality of the 3D image and its viewing angle.

Figure 3:
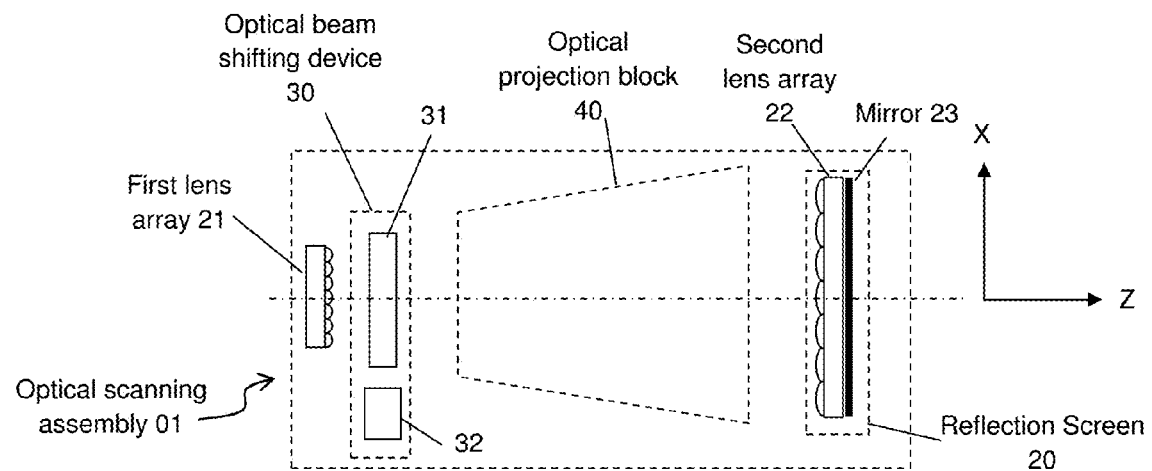
FIG. 3 is a schematic representation of the structure of an optical scanning assembly of a front-projection autostereoscopic 3D display system according to the present invention.

FIG. 3 illustrates the structure of an optical scanning assembly embodying the main idea of the present invention. Optical scanning assembly 01 comprises first lens array 21, optical beam shifting device 30 including optical component 31 for shifting optical beams and driver 32, optical projection block 40 and reflection screen 20 including second converging lens array 22, and mirror 23. The peculiarity of the invented optical scanning assembly consists in that all lens arrays and the optical projection block remain stationary with respect to each other. Instead, the optical beam shifting device is used to provide the scanning operation.

FIG. 3 and the subsequent figures have designations of the rectangular coordinate system, wherein X axis is oriented in horizontal direction, Y axis—in vertical direction, and Z axis defines the axis of optical scanning assembly.

Figure 4A:
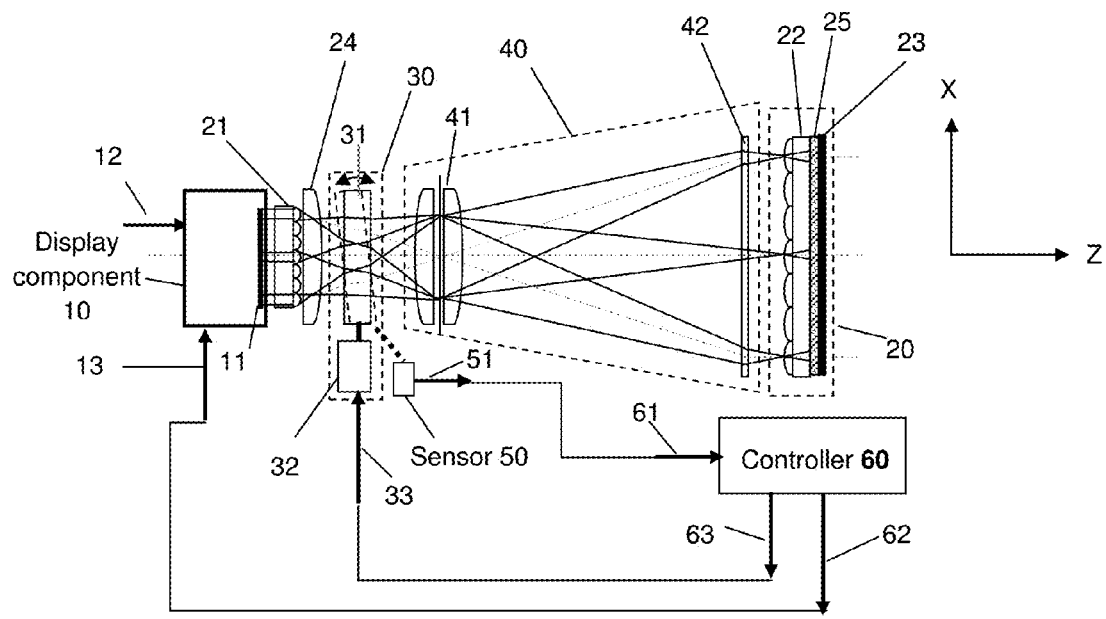
FIG. 4a is a schematic representation of the structure of a front-projection autostereoscopic 3D display system (top view) according to the present invention.

To a full extent the advantages of embodying the main idea of the present invention are realised in the invented frontprojection autostereoscopic 3D display system. A schematic representation of the first embodiment of this 3D display system and the paths of optical beams in this system are shown on FIGS. 4a, 4b, and 4c. The 3D display system (see FIG. 4a, top view) is configured to form a plurality of perspective views of 3D images of an object or scene in a field of view and comprises the display component, the optical scanning assembly, the sensor, and the controller.

Display component 10 is configured for generating a sequence of 2D images and has display surface 11 for displaying 2D images, data input 12 for updating 2D images, and synchronization input 13.

The optical scanning assembly is configured to transform optical beams emanating from each 2D image on displaying surface 11 and to send transformed optical beams in the direction of the corresponding perspective view in the field of view. The optical scanning assembly comprises first lens array 21, optical beam shifting device 30 including optical component 31 for shifting optical beams and driver 32, optical projection block 40 and reflection screen 20 including second converging lens array 22 and mirror 23. Lens arrays 21, reflection screen 20, and optical projection block 40 remain stationary with respect to each other and to display component 10.

Each lens of first lens array 21 is made converging or concave and optically coupled to one respective area of display surface 11 along a respective optical axis (not shown). Each lens of second lens array 22 is optically coupled to one respective lens of first lens array 21 through optical projection block 40 and optical component 31 of optical beam shifting device 30. Whereas mirror 23 and second lens array 22 are disposed from each other at or close to a distance of half of the focal length of lenses of second lens array 22. In some cases field lens 24 can be used for improving homogeneity of the optical beam intensity distribution over the input aperture of optical projection block 40, thereby improving homogeneity of the 3D image intensity distribution.

Optical beam shifting device 30 includes optical component 31 for shifting optical beams going therethrough and driver 32 having control input 33. Optical component 31 is disposed between first lens array 21 and optical projection block 40.

Optical projection block 40 is configured to focusing each optical beam on one respective lens of the second lens array 22 and to send the optical beam reflected from mirror 23 further through the same lens of second lens array 22 in the direction of the corresponding perspective view. Optical projection block 40 includes disposed coaxially projection lens 41 and collimating lens 42, wherein collimating lens 42 is faced toward and disposed close to second lens array 22. In particular, collimating lens 42 can be a Fresnel lens.

Sensor 50 is configured for sensing the position of shifted optical beams and has synchrosignal output 51. Different types of sensors known in the prior art can be used. For example, sensor 50 sensing the movement (e.g., tilt, shift, rotation) of optical component 31 can be used.

Controller 60 is configured for controlling the scanning parameters and synchronisation of 2D images displayed on display surface 11 with the position of shifted optical beams, wherein the synchronisation is based on synchrosignal received from synchrosignal output 51 of sensor 50. Controller 60 has synchrosignal input 61 being connected to synchrosignal output 51 of sensor 50, synchronization output 62 being connected to synchronization input 13 of display component 10, and control output 63 being connected to control input 33 of driver 32 of optical beam shifting device 30.

To widen the viewing angle in the vertical direction, the reflection screen can additionally include vertical diffuser 25 disposed between second lens array 22 and the mirror 23 close to the latter.

It's worth noting that the present invention allows reduction of mechanical complexity of the optical scanning assembly and of the 3D display system as a whole (see FIGS. 4a, 4b, and 4c), if optical beam shifting device 30, first lens array 21, and display component 10 are made significantly smaller than reflection screen 20. The ratio of the lens pitches of first lens array 21 and second lens array 22 should correspond to magnification of optical projection block 40. In this case, the scanning assembly and 3D display system will be much more suitable for implementation of large-screen 3D display systems, and, what is most important, without at the same time increasing the cross-talk level.

When the 3D display system is used for providing 3D image with horizontal parallax, first 21 and second 22 lens arrays are made as respective first 21 and second 22 lenticular arrays oriented vertically.

Paths of optical beams reflected from reflection screen 20 are shown schematically in FIG. 4b (vertical plane) and FIG. 4c (horizontal plane). Optical beams reflected from mirror 23 go further through vertical diffuser 25, second lens array 22 and Fresnel lens 42 to form the field of view. Vertical diffuser 25 spreads the reflected optical beams over angle θ that allows forming extended vertical field of view 71V (FIG. 4b). Fresnel lens 42 provides converging reflected optical beams in extended horizontal field of view 71H (FIG. 4b). Scanning angle β in horizontal plane depends on the amplitude of optical beam shifting by optical component 31 of optical beam shifting device 30 during the scanning operation.

Figure 4D:
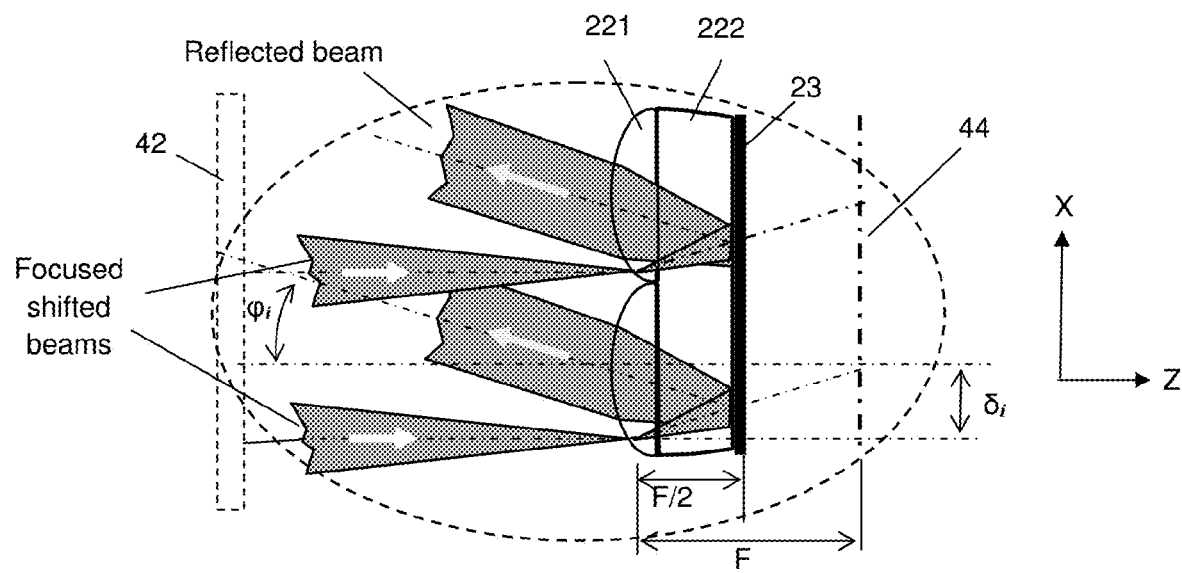
FIG. 4d is a detailed illustration of paths of optical beams reflected from the reflection screen in the horizontal plane.

FIG. 4d shows lenses 221 of second lens array 22 having flat substrate 222 and mirror 23 disposed from lenses 221 at a distance F/2, where F is the focal length of lenses 221. The optical beam focused on one respective lens 221 and reflected from mirror 23 goes further through the same lens in the direction of the corresponding perspective view. The direction of reflected optical beams is designated by angle $\phi_i$ depending on amplitude $\delta_i$ of optical beam shifting.

Figure 5:
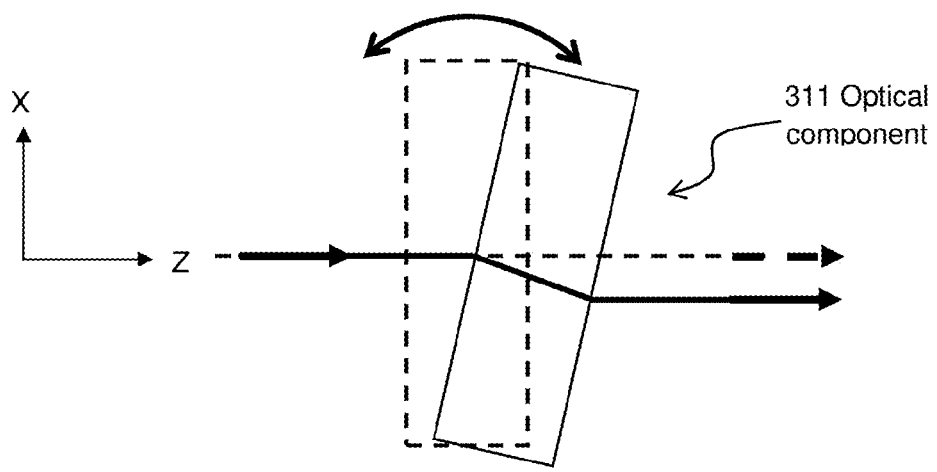
FIG. 5 is a schematic view of an implementation version of the optical component of the optical beam shifting device.

FIG. 5 shows version 311 of optical component 31 that is made as a transparent flat plate disposed vertically with possibility of tilting relative to the vertical axis.

Figure 6:
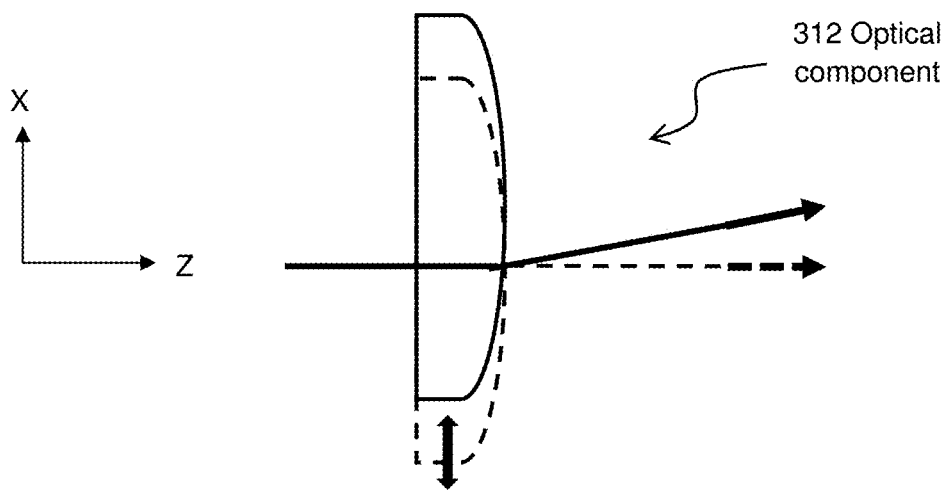
FIG. 6 is a schematic view of an implementation version of the optical component of the optical beam shifting device.

FIG. 6 shows another version 312 of optical component 31 that is made as a field lens disposed with possibility of shifting the field lens horizontally.

Figure 7:
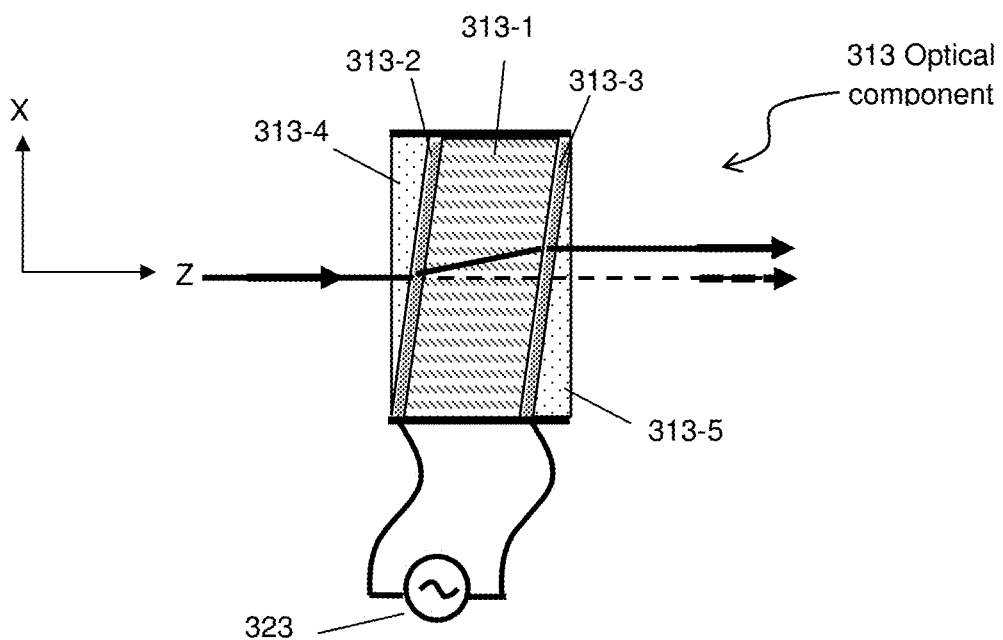
FIG. 7 is a schematic view of an implementation version of the optical component of the optical beam shifting device.

Optical component 31 in version 313 shown in FIG. 7 is made as electro-optical cell 313-1 having flat back sides parallel to each other and coated with transparent electrodes 313-2, 313-3. Cell 313-1 is disposed between two identical optical wedges 313-4, 313-5 placed perpendicular to the optical axis of optical projection block 40 and oriented horizontally in opposite directions.

Figure 8:
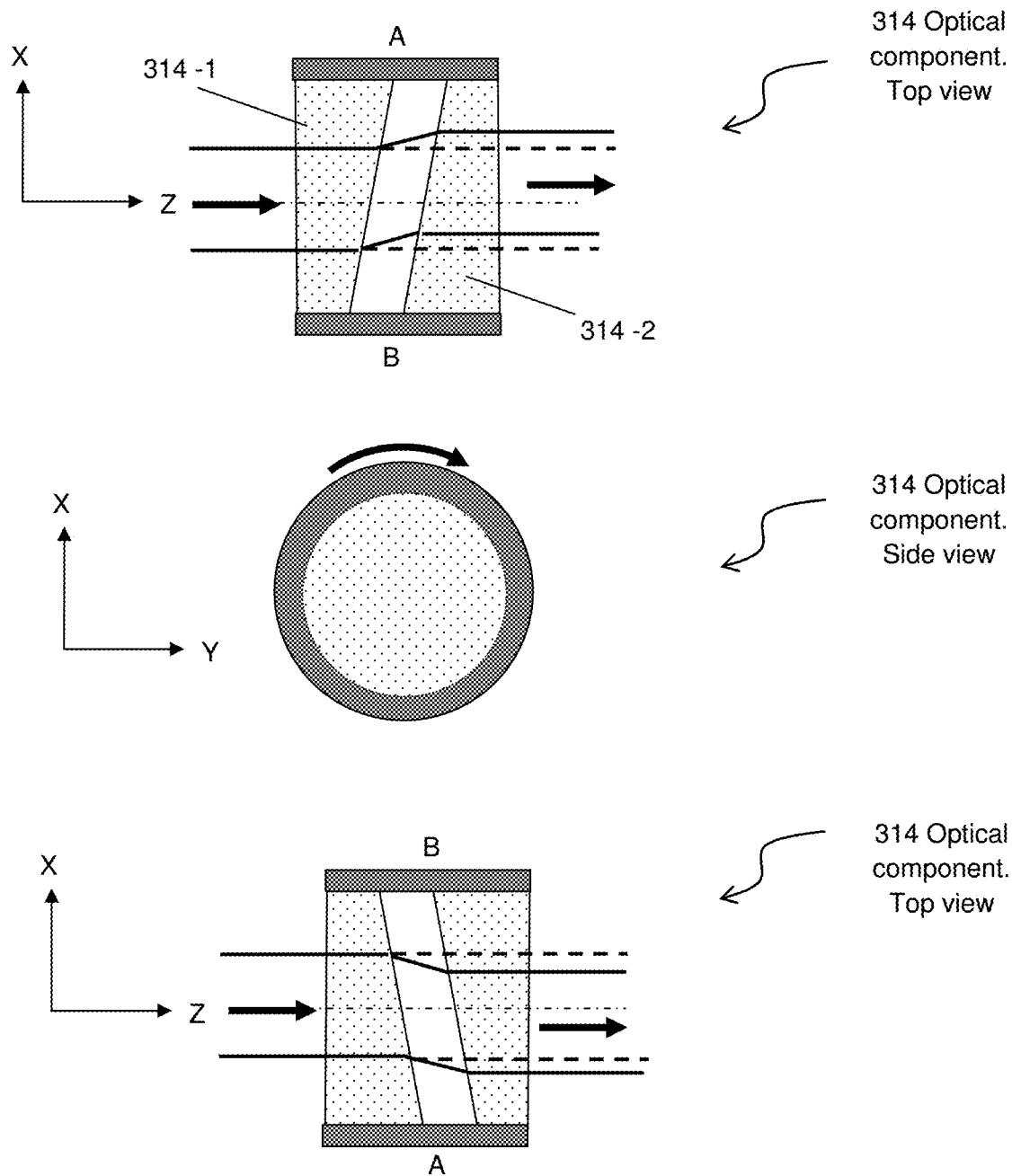
FIG. 8 is a schematic view of an implementation version of the optical component of the optical beam shifting device.

Optical component 31 in version 314 shown in FIG. 8 consists of two identical optical wedges 314-1, 314-2 disposed in opposite directions perpendicular to and with a gap along the optical axis of optical projection block 40 with possibility of rotation around this axis.

Figure 9A:
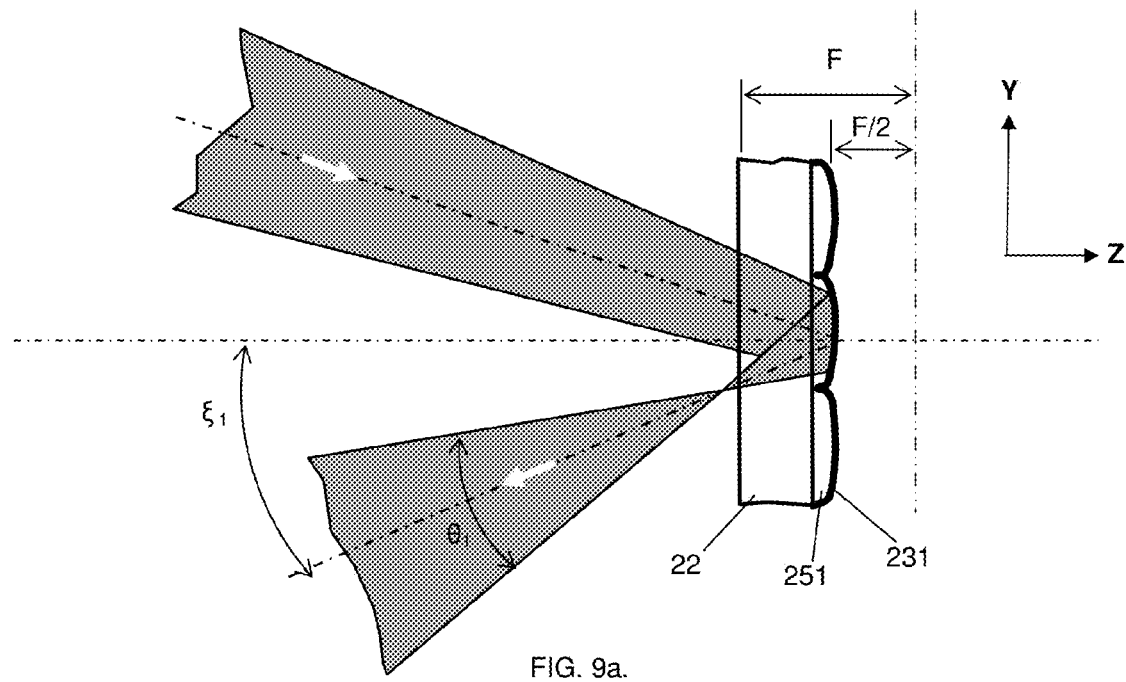
FIGS. 9a, 9b, and 9c are schematic views of implementations of the reflection screen having different vertical diffusers.
Figure 9B:
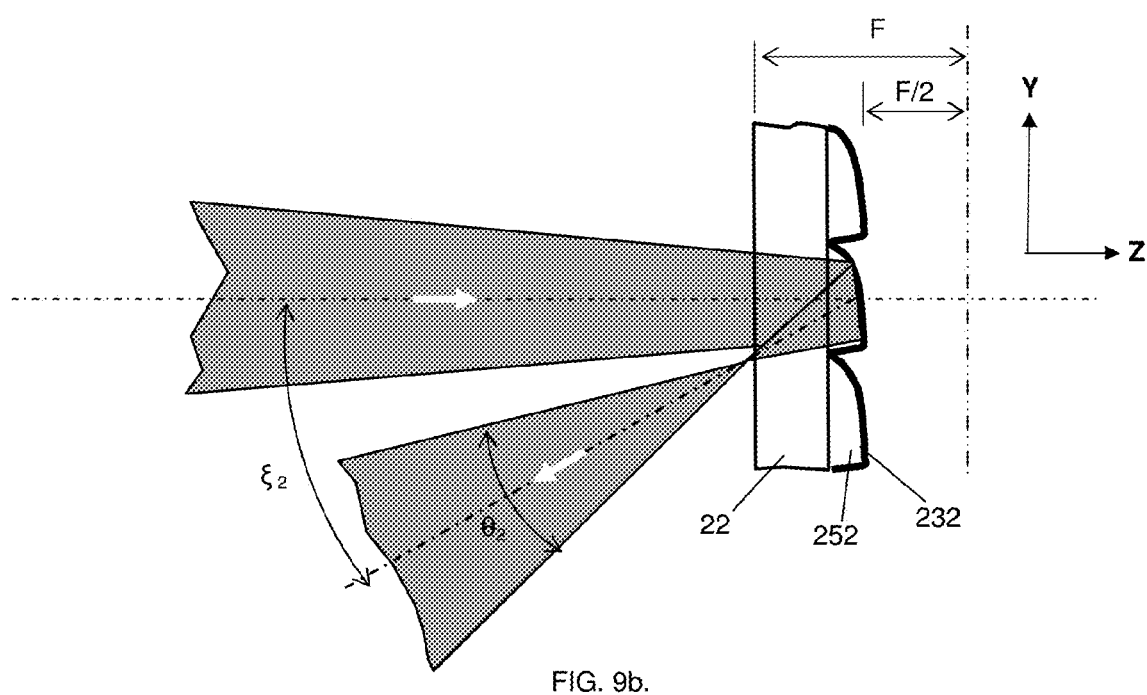
Figure 9C:
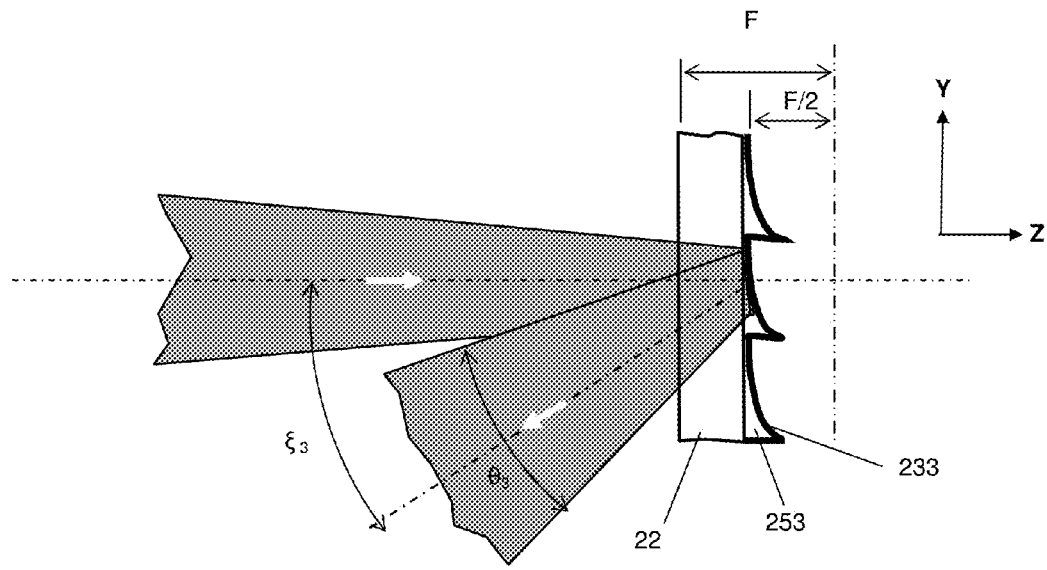

Different implementations of reflection screen 20 with respective variants of vertical diffuser 25 are shown in FIGS. 9a, 9b, and 9c. In all variants, mirrors 231, 231, 233 are disposed from the lenses of second lens array 22 at a distance F/2, where F is the focal length of these lenses.

Vertical diffuser 25 in variant 251 shown in FIG. 9a is made as a regular lenticular lens array oriented horizontally and mirror 231 is deposited on the curved surface of lenticular lens array 251. $\epsilon_1$ designates the angle between the direction of the reflected optical beams and the horizontal plane. $\theta_1$ designates the angle of spreading of reflected optical beams in the vertical plane.

Vertical diffuser 25 in variant 252 shown in FIG. 9b is made as an array of cylindrical off-axis converging lenses oriented horizontally and mirror 232 is deposited on the curved surface of array 252. $\epsilon_2$ designates the angle between direction of the reflected optical beams and the horizontal plane. $\theta_2$ designates the angle of spreading of reflected optical beams in the vertical plane.

Vertical diffuser 25 in variant 253 shown in FIG. 9c is made as an array of cylindrical off-axis concave lenses oriented horizontally and mirror 233 is deposited on the curved surface of array 253. $\epsilon_3$ designates the angle between the direction of the reflected optical beams and the horizontal plane. $\theta_3$ designates the angle of spreading of reflected optical beams in the vertical plane.

Figure 10A:
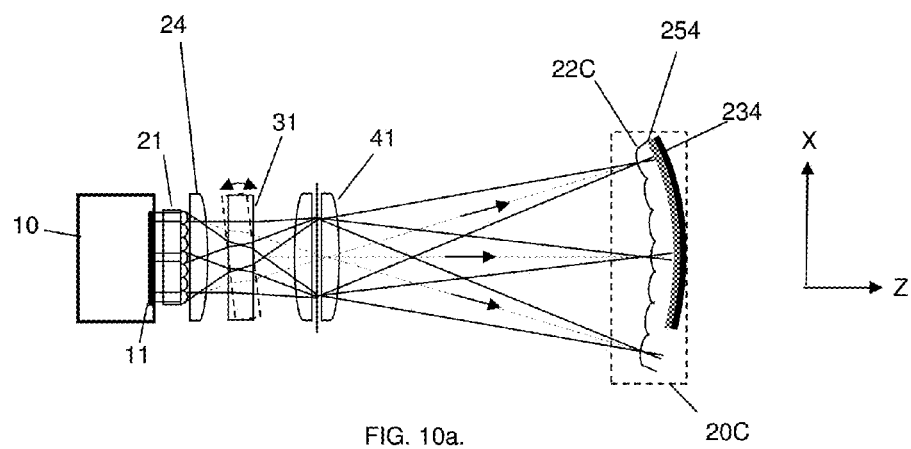
FIG. 10a is a schematic representation of the structure of a front-projection autostereoscopic 3D display system (top view) with a curved reflection screen.
Figure 10B:
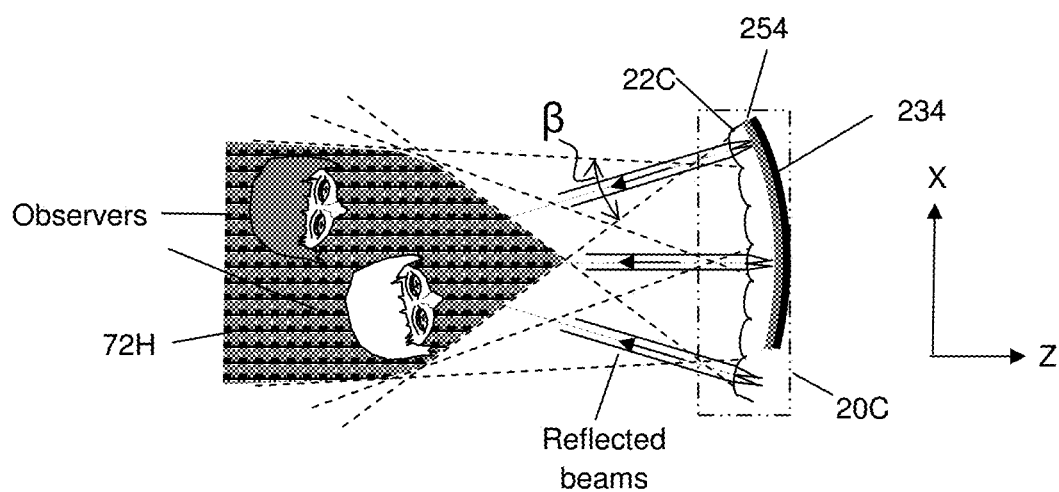
FIG. 10b is a schematic representation of the curved reflection screen of the 3D display system shown in FIG. 10a with the illustration of paths of optical beams reflected from the screen in the horizontal plane.

FIGS. 10a and 10b represent schematically the second embodiment of the invented front-projection autostereoscopic 3D display system. In contrast to the first embodiment discussed with reference to FIGS. 4a, 4b, and 4c, the second embodiment uses a curved reflection screen instead of a flat one and a different implementation of the optical projection block. And so, the description of the second embodiment turns to be just the same as that of the first embodiment, except for the reflection screen. As to the optical projection block, it can be made as a projection lens and collimating lens is not required.

The description of the curved reflection screen is following with reference to FIGS. 10a and 10b. Curved reflection screen 20C includes second lenticular lens array 22C having a cylindrical or spherical substrate, respective vertical diffuser 254, and mirror 234. Mirror 234 is disposed from the lenses of second lens array 22C at a distance F/2, where F is the focal length of these lenses.

FIGS. 10a and 10b illustrate paths of optical beams focused on lenses of second lens array 22C and optical beams reflected from curved reflection screen 20C respectively. Scanning angle β in the horizontal plane depends on the amplitude of optical beam shifting by optical component 31 during scanning operation. Curved reflection screen 20C provides converging reflected optical beams in extended horizontal field of view 72H (FIG. 10b).

The front-projection autostereoscopic 3D display system operates as follows (see FIGS. 3 and 4). Display component 10 generates a sequence of 2D images to be displayed on displaying surface 11. Optical beams emanating from each 2D image on displaying surface 11 are transformed by optical scanning assembly 01 to be sent in the direction of the corresponding perspective view in the field of view. Because first lens array 21 is stationary with respect to display component 10, the structure of optical beams emanating from display surface 11 matches that of first lens array 21 during scanning operation. Thereby, the cross-talk level associated with the said second source of cross-talk is significantly reduced or eliminated.

Each optical beam going through one respective lens of first lens array 21 and optical component 31 is focused by optical projection block 40 on one respective lens of second lens array 22 and the optical beam reflected from mirror 23 passes further through the same lens of second lens array 22 in the direction of the corresponding perspective view. During the scanning operation, the focal point of an optical beam passing through each lens of second lens array 22 is shifted within the aperture of the said lens. As a result, the optical beam reflected from mirror (reflector) 23 passing further through the same lens of second lens array 22 is contained within the aperture of the latter lens. This allows matching the structure of these optical beams to that of reflection screen 20 during scanning operation. Therefore, cross-talk associated with the said first source of cross-talk is significantly reduced or eliminated and thereby quality of the 3D image and its viewing angle are increased.

To provide scanning operation, optical component 31 of optical beam shifting device 30 carries out transversal shifting of optical beams propagating between first lens array 21 and reflection screen 20. Optical beam shifting device 30 provides reciprocative shifting of the optical beams to carry out the scanning operation of the 3D display system. Working parameters of the shifting operation (e.g., amplitude and period of optical beam shifting) are controlled by controller 60 through control output 63 and control input 33 of driver 32 of optical beam shifting device 30. This allows controlling parameters of the scanning operation (the number perspective views, the viewing angle, the scanning period, etc.). Thus, optical beam shifting by amount 5, corresponds to perspective view i in the direction shown by angle $\phi_i$ (see FIG. 4d).

Sensor 50 is used for sensing the position of optical beams shifted by optical component 31 and forming the synchrosignal at synchrosignal output 51. This synchrosignal is directed to synchrosignal input 61 of controller 60 for the synchronisation of 2D images displayed on the display surface 11 with the position of shifted optical beams. The synchronisation is accomplished through synchronization output 62 of controller 60 and synchronization input 13 of display component 10.

The present invention allows using versions of the implementation of optical component 31 of optical beam shifting device 30 that are illustrated in FIGS. 5-8.

Optical component 31 of version 311 (FIG. 5) is made as a transparent flat plate disposed vertically with possibility of tilting relative to the vertical axis. Driver 32 of optical beam shifting device 30 provides said tilting (designated by curved arrow) of optical component 31 in accordance with the control signal from controller 60 through control output 63 and control input 33 of driver 32 (see FIG. 4a).

Optical component 31 of version 312 (FIG. 6) is made as a field lens disposed with the possibility of horizontal shift. Driver 32 of optical beam shifting device 30 provides reciprocating shifting motion of the field lens in accordance with the control signal from controller 60 through control output 63 and control input 33 of driver 32. As a result, optical beams at second lens array 22 are shifted (see FIG. 4a).

Optical component 31 in version 313 shown in FIG. 7 is made as electro-optical cell 313-1 having flat back sides parallel to each other and coated with transparent electrodes 313-2, 313-3. Driver 32 of optical beam shifting device 30 receives the control signal from controller 60 through control output 63 and control input 33 of driver 32 (see FIG. 4a) and applies electric voltage to transparent electrodes 313-2, 313-3 of electro-optical cell 313-1.

Optical component 31 in version 314 shown in FIG. 8 consists of two identical optical wedges 314-1, 314-2 disposed in opposite directions perpendicular to and with a gap along the optical axis of optical projection block 40 with possibility of rotation around this axis. Driver 32 of optical beam shifting device 30 provides the said rotation (designated by curved arrow) of optical component 31 in accordance with the control signal from controller 60 through control output 63 and control input 33 of driver 32 (see FIG. 4a). As a result, optical beams at second lens array 22 are shifted. Letters A and B designate opposite sides of optical component 31 in version 314.

All variants of vertical diffuser 25 (251, 252, and 253) shown in FIGS. 9a, 9b, and 9c provide necessary spread angles ($\theta_1$, $\theta_2$, $\theta_3$) and directions ($\epsilon_1$, $\epsilon_2$, $\epsilon_3$) of reflected optical beams in the vertical plane.

FIGS. 10a and 10b illustrate paths of optical beams focused on lenses of second lens array 22C and optical beams reflected from curved reflection screen 20C respectively. Scanning angle β in the horizontal plane depends on the amplitude of optical beam shifting by optical component 31 during the scanning operation. Curved reflection screen 20C provides converging reflected optical beams in an extended horizontal field of view 72H (FIG. 10b). Therefore, in contrast to the first embodiment, the second embodiment of the present invention allows further reduction of mechanical complexity of the front-projection autostereoscopic 3D display system, especially with a large screen because the collimating lens is not required for the curved reflection screen.

While the present invention has been described in the context of the embodiments illustrated and described herein, the invention may be embodied in other specific ways or in other specific forms without departing from its spirit or essential characteristics. Therefore, the described embodiments are to be considered in all respects as illustrative and not restrictive. It will be apparent to those skilled in the art that various modifications and variations can be made to the front-projection auto stereoscopic 3D display system without departing from the spirit or scope of the invention as it is described in the appended claims.

What is claimed is:

1. A front-projection autostereoscopic three-dimensional (3D) display system for forming a plurality of perspective views of 3D images of an object or scene in a field of view, comprising:
a display component for generating a sequence of 2-dimensional (2D) images, the display component having a display surface for displaying 2D images, a data input for updating 2D images, and a synchronization input;
an optical scanning assembly for transforming optical beams emanating from each 2D image on the displaying surface and sending transformed optical beams in the direction of the corresponding perspective view in the field of view,
the optical scanning assembly including: a first lens array, an optical beam shifting device, an optical projection block, and a reflection screen including a second converging lens array and a mirror (reflector), wherein the first lens array, the optical projection block and the reflection screen being stationary with respect to each other and to the display component, and wherein
each lens of the first lens array being optically coupled to one respective area of the display surface along a respective optical axis, and
each lens of the second lens array being optically coupled to one respective lens of the first lens array through the optical projection block and the optical beam shifting device, whereas the mirror and the second lens array being disposed from each other at or close to a distance of half of the focal length of lenses of the second lens array;
the optical beam shifting device including: an optical component for shifting optical beams passing therethrough and a driver having a control input;
the optical projection block being configured for focusing each optical beam on one respective lens of the second lens array and sending the optical beam reflected from the mirror further through the same lens of the second lens array in the direction of the respective perspective view;
a sensor configured for sensing the position of shifted optical beams, the sensor having a synchrosignal output; and
a controller configured for controlling scanning parameters and synchronisation of 2D images displayed on the display surface with the position of shifted optical beams, the controller having a synchrosignal input being connected to the synchrosignal output of the sensor, a synchronization output being connected to the synchronization input of the display component, and a control output being connected to the control input of the driver of the optical beam shifting device.

2. The front-projection 3D display system of claim 1 wherein the size of the first lens array is different from the size of the second array and a ratio of the pitches of lenses of these arrays corresponds to magnification of the optical projection block.

3. The front-projection 3D display system of claim 2 wherein the first lens array is made smaller than the reflection screen.

4. The front-projection 3D display system of claim 1 wherein lenses of the first lens array are converging or concave.

5. The front-projection 3D display system of claim 1 wherein the first and second lens arrays are respectively the first and the second lenticular arrays oriented vertically.

6. The front-projection 3D display system of claim 1 wherein the optical scanning assembly includes additionally a field lens disposed between the optical beam shifting device and the first lens array close to the latter.

7. The front-projection 3D display system of claim 1 wherein the optical component of the optical beam shifting device is made as a transparent flat plate disposed perpendicular to horizontal plane with possibility of tilting relative to the vertical axis.

8. The front-projection 3D display system of claim 1 wherein the optical component of the optical beam shifting device is made as a transparent flat plate inclined relative to the optical axis of the optical projection block with the possibility of rotation around this axis.

9. The front-projection 3D display system of claim 1 wherein the optical component of the optical beam shifting device consists of two identical optical wedges disposed in opposite directions perpendicular to and with a gap along the optical axis of the optical projection block with the possibility of rotation around this axis.

10. The front-projection 3D display system of claim 1 wherein the optical component of the optical beam shifting device is made as a cell of electro-optical material, the cell being disposed in the vertical plane, inclined to the optical axis of the optical projection block and provided with transparent electrodes.

11. The front-projection 3D display system of claim 1 wherein the optical component is disposed between the first lens array and the optical projection block.

12. The front-projection 3D display system of claim 1 wherein the optical component of the optical beam shifting device is made as a field lens disposed with possibility of horizontal shift.

13. The front-projection 3D display system of claim 1 wherein the reflection screen is made flat and the second lens array has a flat substrate.

14. The front-projection 3D display system of claim 13 wherein the optical projection block includes a projection lens and a collimating lens, wherein the collimating lens is faced toward and disposed close to the second lens array.

15. The front-projection 3D display system of claim 14 wherein the collimating lens is a Fresnel lens.

16. The front-projection 3D display system of claim 13 wherein the mirror has a flat substrate.

17. The front-projection 3D display system of claim 1 wherein the reflection screen has additionally a vertical diffuser disposed between the second lens array and the mirror close to the latter.

18. The front-projection 3D display system of claim 17 wherein the vertical diffuser is made as a holographic diffuser.

19. The front-projection 3D display system of claim 17 wherein the vertical diffuser is made as a lenticular lens array oriented horizontally and the mirror is deposited on the curved surface of this lenticular lens array.

20. The front-projection 3D display system of claim 17 wherein the vertical diffuser is made as an array of cylindrical off-axis lenses oriented horizontally and the mirror is deposited on the curved surface of this array.

21. The front-projection 3D display system of claim 20 wherein said lenses are made converging or concave.

22. The front-projection 3D display system of claim 1 wherein the reflection screen is made curved and the optical projection block is made as a projection lens.

23. The front-projection 3D display system of claim 22 wherein the second lens array of the curved reflection screen has a cylindrical substrate with a vertical axis.

24. The front-projection 3D display system of claim 22 wherein the second lens array of the curved reflection screen has a spherical substrate.

25. The front-projection 3D display system of claim 22 wherein the second lens array of the curved reflection screen has an off-axis spherical substrate.

* * * * *